A. S. NOTESTEIN.
Corn-Planter.
No. 27,647.
Patented Mar. 27, 1860.
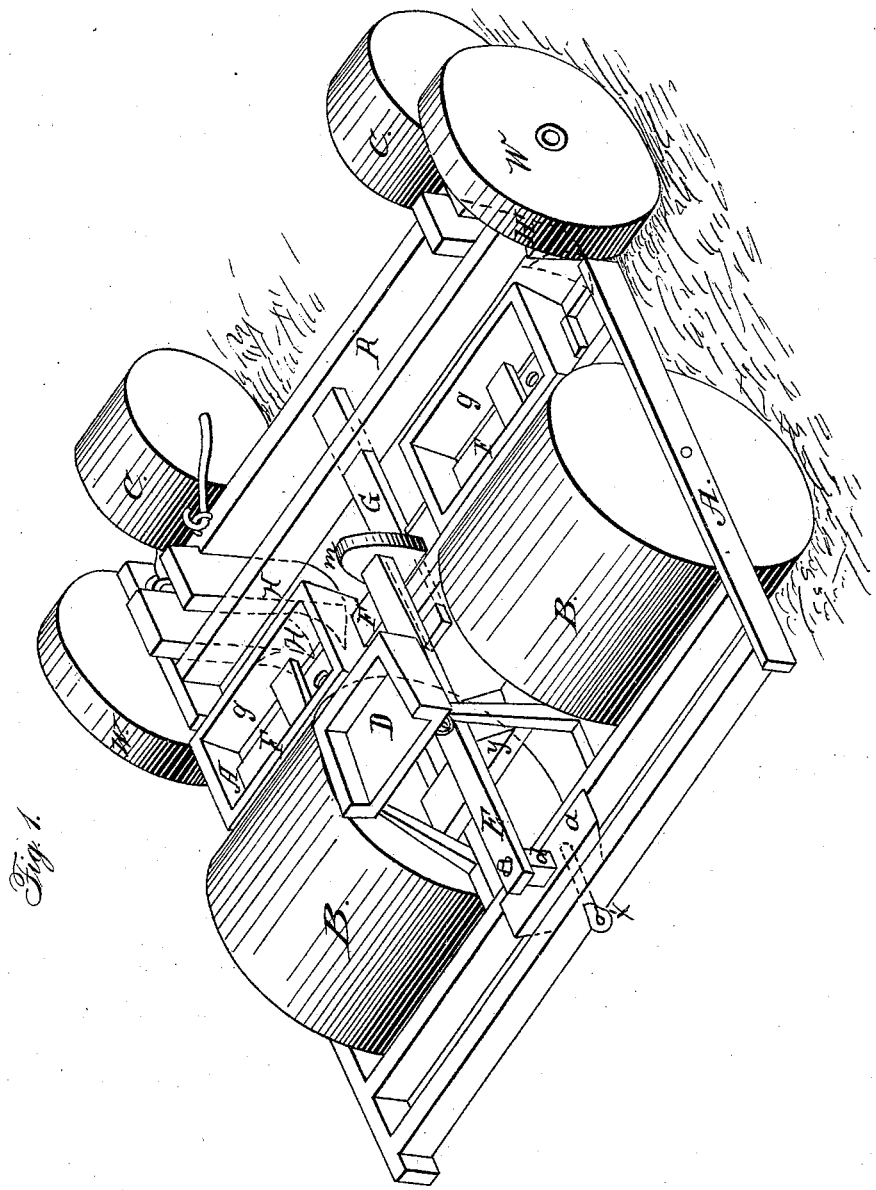
Witnesses:
C. M. Alexander
A. Gentman
Inventor:
A. S. Notestern

UNITED STATES PATENT OFFICE.

A. S. NOTESTEIN, OF SALEM, IOWA, ASSIGNOR TO HIMSELF AND L. I. ROGERS.

IMPROVEMENT IN SEEDING-MACHINES.

Specification forming part of Letters Patent No. 27,647, dated March 27, 1860.

*To all whom it may concern:*

Be it known that I, A. S. NOTESTEIN, of Salem, in the county of Henry and State of Iowa, have invented certain new and useful Improvements in Seeding-Machines; and I do hereby declare the following to be a full, clear, and exact description of the same, reference being had to the annexed drawing, and to the letters of reference marked thereon, in which is represented the entire machine complete in all its parts in perspective.

The nature of my invention consists in the particular arrangement of the various devices which will be hereinafter named.

To enable others skilled in the art to make and use my invention, I will now describe its construction and operation, similar letters referring to like parts.

In the figure, A represents the frame; D, the driver's seat, upon each side of which are the two rollers B B. Said rollers should be of sufficient weight to break and level the clods over which they pass, and thus prepare the ground for the succeeding operation.

W W represent two wheels, which support the hinder portion of the machine.

C C are two rollers, the object of which will be seen more fully hereinafter. Said rollers are attached to the frame by means of a loop of wire passing through their centers and hooking into a staple which is driven into the frame, as fully shown in the drawing.

It will be observed that the frame to which the wheels W W are attached is connected to the main frame A by means of a short tongue, (marked G.) Thus it can be readily disconnected when desired.

H H H H represent four plows, two of which are secured immediately in front of each of the rollers $c\ c$. These plows are designed to cover the grain, and therefore they are made to turn toward each other.

$g\ g$ represent two grain-boxes, each of which is provided in the center of its bottom with an aperture for the exit of the grain.

F is a seed-slide, which is also provided with apertures for the escape of the grain.

E represents a lever, which is pivoted to block $y$.

$a$ is a foot-piece, which is pivoted through its center by pin $x$.

$d$ represents a standard secured to said foot-piece. The standard $d$ passes loosely through the lever E, as represented. The opposite end of the lever E is connected to slide F by means of a pin passing through the upright $m$, as fully shown.

The operation of my machine is as follows: Power being applied and the operator being seated with one foot on each end of the foot-piece $a$, the machine is put in motion. The rollers B B, as they are in advance, break the clods and level the ground. A spout which is placed under each seed-box follows and makes a furrow. The operator by means of his feet rocks the foot-piece $a$, which communicates motion to the seed-slide F by lever E, thus the seed are distributed in the desired places, while the coverers follow and cover the grain, and the rollers $c\ c$ again level all unevenness created by the coverers, and leaves the earth in a mellow condition.

Having thus fully described my invention, what I claim as new, and desire to secure by Letters Patent, is—

The arrangement of the foot-piece $a$, the rocking standard $d$, the lever E, and seed-slide F, with the rollers B and C and coverers H H, when the several parts are connected and used substantially as and for the purpose specified.

A. S. NOTESTEIN.

Witnesses:
JOHN HARPER,
IRA McDANIEL.